UNITED STATES PATENT OFFICE.

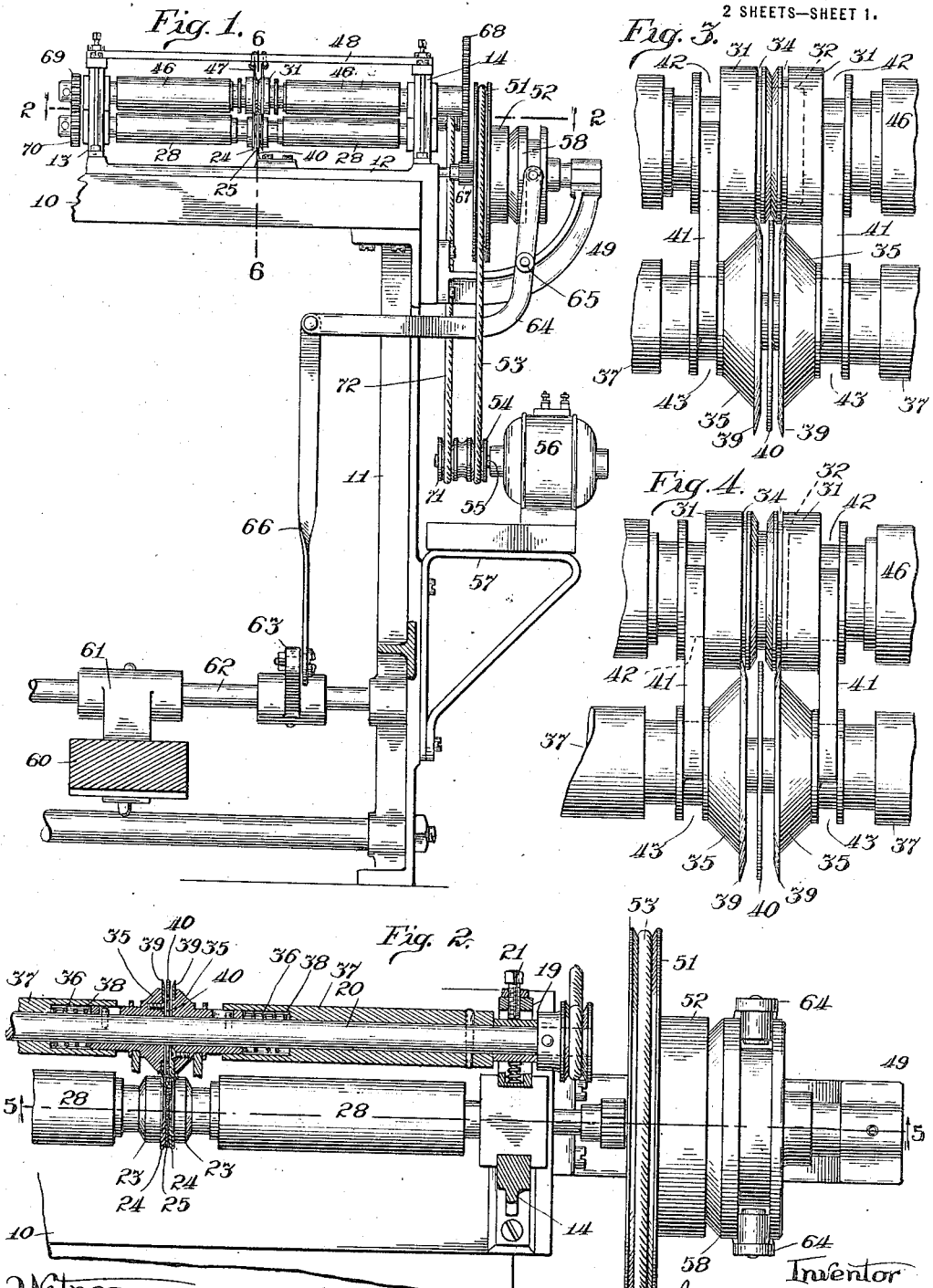

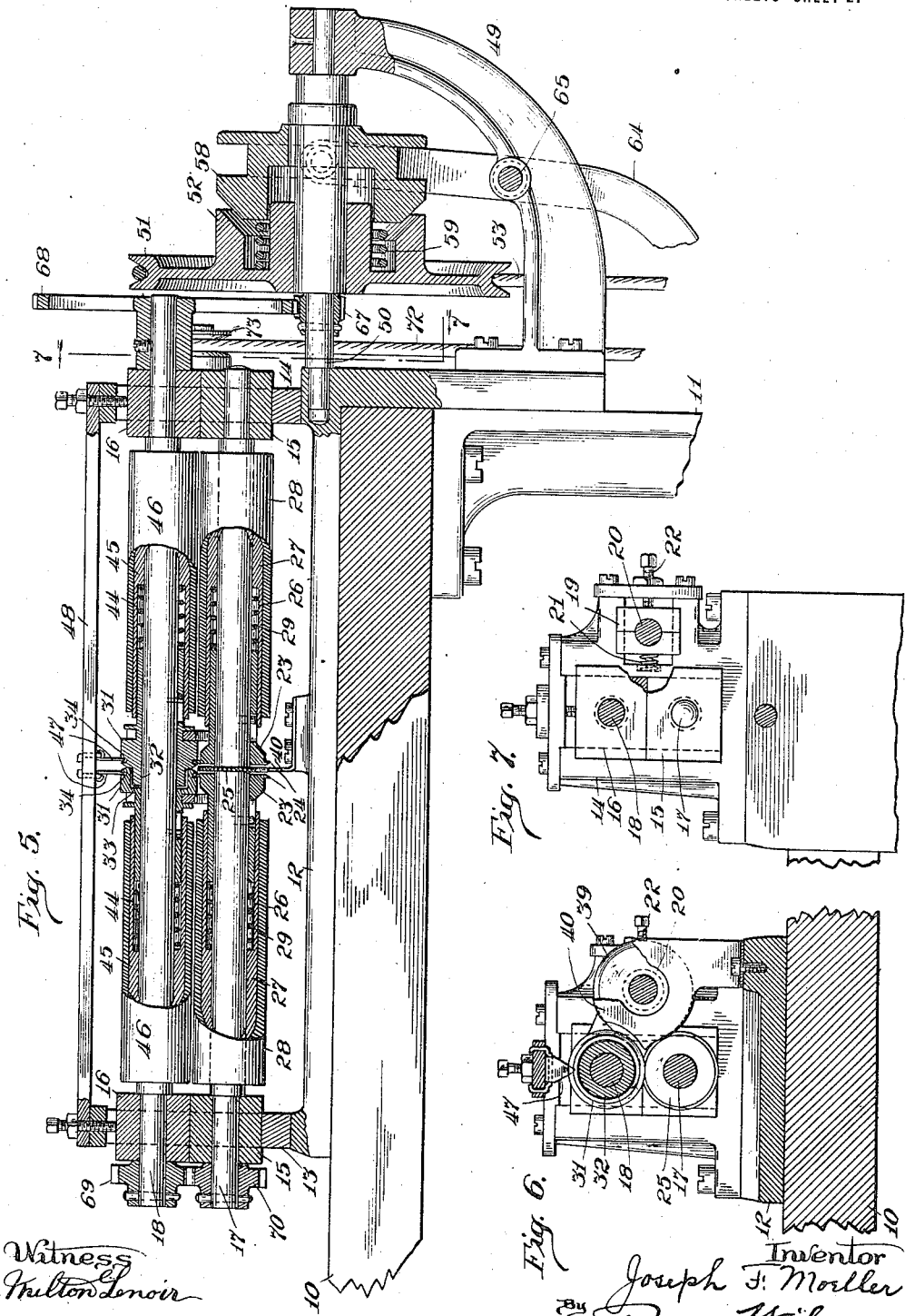

JOSEPH F. MOELLER, OF CHICAGO, ILLINOIS.

LEAF-STEMMING MACHINE.

1,261,267. Specification of Letters Patent. Patented Apr. 2, 1918.

Application filed April 27, 1916, Serial No. 93,861. Renewed August 27, 1917. Serial No. 188,481.

*To all whom it may concern:*

Be it known that I, JOSEPH F. MOELLER, a citizen of the United States, residing at Chicago, in the county of Cook and State of Illinois, have invented certain new and useful Improvements in Leaf-Stemming Machines, of which the following is a specification.

This invention relates to the art of leaf-stemming machines, and has been designed principally as a machine for stemming tobacco leaves, although obviously capable of similarly operating upon the leaves of any plants which present a main or central stem that in the treatment and subsequent use of the leaves is to be eliminated.

The matter of cutting the central stem from a tobacco-leaf by a machine operation in such a manner as to effect a clean cut without waste of portions of the leaf lying closely adjacent to the stem has hitherto presented considerable difficulty owing, as I believe, largely to the fact that the central stems of the leaves are more or less crooked or sinuous, and the cutters, instead of following the sinuosities of the stem, not infrequently cut across it, and thus get out of true relation to the leaf. While a considerable patented art has developed on tobacco-stemming machines, so far as I am aware, but few of these machines have proved practical in service, and tobacco leaves are still stemmed by hand for the most part.

After much study and experiment, I have designed a machine for this work wherein the cutting devices are so mounted and controlled as to be readily able to follow and track with any curvature of the stem and hug the latter closely throughout its entire extent so as to insure a clean excision of the stem with practically no waste of leaf material on the sides of the stem. This result is attained chiefly through a novel arrangement of feed rolls and a cutting element coöperating therewith so organized and connected that the individual roller and cutter elements that operate on each side of the stem are capable of lateral yielding movement, whereby not only do the cutter and feed-roller members closely hug the stem from its wide to its narrow end throughout the length of the leaf, but readily track with the stem and follow any curves or sinuosities in the latter without any chance of riding or cutting across the stem.

Another feature of the invention which contributes in large measure to its successful operation lies in the provision of a cutter-member coöperating with the feed devices that operates at a speed largely in excess of the speed of the feed devices. The feed devices preferably, and in the form herein illustrated, consist of two pairs of coöperating feed-roller elements, the members of each pair of which are movable toward and from each other, and spring-backed so as to vary the transverse dimension of the groove through which the stem passes, comfortably to the variations in width of the latter between the butt and pointed end of the stem; while the cutting element preferably, and as herein shown, takes the form of a coöperating pair of rotary knives that are also spring-backed, and the peripheries of which engage grooves in the feed-rollers of either or both pairs on either side of the feed-groove which lies between and is formed by the individual rollers of the two pairs. In such an organization, the rotary cutters are driven at a peripheral speed largely in excess of the peripheral speed of the feed-rollers, whereby a pronounced draw-cut is effected on the leaf; and the sides of the cutters which engage the sides of the stem are beveled, this formation of the cutter serving to prevent the latter from riding across and severing the stem, especially at points where the stem may be more or less bent or curved.

The machine of my invention is further provided with means for directly connecting the feed-roller mechanism with the cutter mechanism so as to produce equal and simultaneous lateral movements of the movable elements of said mechanisms.

The machine of my invention, its principle and mode of operation, and the advantages attending the same, will all be readily understood by those skilled in the art from a consideration of the accompanying drawings, taken in connection with the following detailed description, wherein I have illustrated and described one practical and workable embodiment of the invention. Referring to the drawings—

Figure 1 is a front elevational view of the complete machine, broken away at one side of the supporting table or platform;

Fig. 2 is a fragmentary top plan view in horizontal longitudinal section through the cutter mechanism and with the upper feed-roll omitted;

Figs. 3 and 4 are enlarged detail views in top plan of the cutter and upper feed-rolls, Fig. 3 illustrating the contracted position of said parts, and Fig. 4 an expanded position thereof;

Fig. 5 is an elevational view, partly in longitudinal section, through the two pairs of feed-rolls and their supporting and operating mechanism;

Fig. 6 is a cross-sectional view substantially in the plane of the feed-groove;

Fig. 7 is an end elevation of the parts shown in Fig. 6.

Referring to the drawings, 10 designates the top and 11 one of the side frame members of a suitable supporting-table on which the machine may be conveniently mounted for power drive and manual control by the operator. 12 designates a base plate and 13 and 14 end uprights of a roller supporting frame, these latter being slotted to receive the journal-blocks 15 and 16 of a pair of shafts 17 and 18 respectively, which latter carry the feed-roller mechanism. The end frames 13 and 14 are also horizontally slotted to support journal-blocks 19 carrying the journals of a cutter-shaft 20, the journals of the latter shaft being adjustable toward and from the feed-rolls in any convenient manner as by the spring 21 and adjusting screw 22, clearly shown in Fig. 7.

Sleeved upon and splined to the feed-roller shaft 17 are a pair of coöperating feed-roller members 23, the inner opposing ends of which are formed with annular flanges 24, the inner or opposed faces of which are preferably beveled as shown; and fast on the shaft 17 between said feed-roller members 23 is a ring 25, preferably having a knurled or roughened edge, as shown, to enhance the gripping effect upon the stem. The sleeve extensions of the feed-roller members 23 are slidable within recesses or sockets 26 formed in the inner opposed ends of a pair of tube or pipe sections 27 that surround and are fast to the shaft 17, these tube or pipe sections being in turn preferably equipped with rubber coverings 28. Within the sockets 26 are light coil springs 29 which form spring backings for the feed-roller members 23, normally urging the latter toward each other or into engagement with the central ring member 25.

The upper feed-roller shaft 18 is equipped with a quite similar mechanism that coöperates with that on the lower shaft 17, and comprising a pair of feed-roller members 31 sleeved on and splined to the shaft 18. The inner opposed faces of the roller members 31 are beveled or tapered to provide a V-groove effect between them, and a bottom for this groove, when the members are more or less separated, is provided by a mandrel 32 on the face of one of the members slidably engaging a recess or socket 33 in the other. The mandrel 32 thus not only affords a bottom for the groove but also aids in maintaining accurate endwise alinement of the two roll members 31. The members 31, just behind their beveled faces are formed with relatively fine annular grooves 34 that are engaged by the flanges 24 of the underlying roller members 23, as most clearly shown in Fig. 5, thus insuring simultaneous and equal expanding and contracting movements of the two pairs of feed-rolls.

Referring principally to Fig. 2, on the shaft 20 are sleeved and splined a pair of cutter heads 35, the sleeve ends of which are slidable in sockets 36 formed in the inner ends of a pair of pipe or tube sections 37 that embrace the shaft 20, said cutter heads being normally forced toward each other by light coil springs 38 within the sockets 36. The cutter heads 35 carry rotary cutter blades 39, one mounted on each head; and between the cutter blades 39 is a stationary guide member 40, best shown in Fig. 6, that lies opposite and in the transverse plane of the ring member 25 on the lower feed roll shaft. The cutter shaft 20 passes through the guide member 40 and the latter is mounted at its lower end on the frame piece 12. The cutting edges of the cutter blades 39 enter the grooves 34 of the upper feed roller, as most clearly shown in Figs. 3 and 4. This engagement of the grooves 34 with the cutting edges of the blades 39 suffices to cause the expanding and contracting movements of the feed roller members 31 to be imparted to the cutter heads 35 and blades 39; but I prefer to relieve the cutter blades of such strain by providing independent means for causing simultaneous and equal contracting and expanding movements of the feed roll members and the cutter heads, this means consisting of a pair of yoke bars 41 having concave or forked ends which engage alined annular grooves 42 and 43 in the feed roller members 31 and the cutter heads 35 respectively.

The feed roller members 31, which are sleeved and splined on the shaft 18, have their sleeve extensions slidable within recesses or sockets 44 formed in the inner opposed ends of a pair of tube or pipe sections 45 that surround and are fast to the shaft 18, these tube or pipe sections being in turn preferably equipped with rubber coverings 46 similar to the rubber coverings 28 of the lower feed roller shaft. It should be clearly understood that these rubber covered rolls are not feed rolls for the leaf except to the extent of the described feed roll devices which they carry and which engage the stem of the leaf, being out of contact with each other and serving merely to guide and in a measure to smooth out portions of the leaf on either side of the central stem.

Inasmuch as the grooves 34 of the upper feed roll in time become more or less clogged with sawdust, gum, and the like from the damp leaves that are forced into them, I provide an automatic cleaning mechanism for said grooves consisting, in the instance shown, of a pair of cleaner fingers 47 that are pivotally suspended above the grooves from a bar 48 supported at its ends on the end-uprights 13 and 14. The pointed lower ends of the cleaner fingers 47 engage the grooves 34 to the full depth of the latter, and the fingers are so pivoted that their lower pointed ends are free to partake of the expanding and contracting movements of the feed roller members 31 without withdrawing the cleaner finger from the grooves.

In the operation of the mechanism described the two feed roll shafts 17 and 18 are driven in opposite directions at equal speeds, and the cutter shaft is driven at a relatively high speed in the same direction of rotation as that of the lower feed roll shaft. Any suitable or convenient driving or operating mechanism may be employed for effecting the described movements of the parts, but a simple and convenient mechanism is illustrated in the drawings and comprises the following parts:

In one side frame member 11 and a bracket 49 secured thereto is journaled a shaft 50, loosely mounted on which is a pulley 51 having a clutch hub 52. Pulley 51 is driven, in the instance herein shown, by a belt 53 from a pulley 54 fast on the armature shaft 55 of an electric motor 56; this latter being conveniently supported on a bracket 57 carried by the side frame member 11. Splined on the shaft 50 is a clutch member 58 that is normally held out of engagement with the clutch hub 52 by a spring 59 housed within the hub 52. The shaft-driven clutch member 58 is thrown into engagement with the clutch hub 52 by foot-operated clutch-shifting mechanism which, in the simple form illustrated in Fig. 1, may comprise a pedal 60 on the free end of a pedal arm 61, this latter being fast on a rock shaft 62 journaled in and between the side frame members 11, an arm 63 also fast on the shaft 62, an elbow lever 64 pivoted at 65 to the bracket 49 and at its upper end engaging the clutch member 58, and a link 66 connecting the arm 63 and the inner end of the elbow lever 64. When the pedal 60 is depressed, the clutch member 58 will be thrown into driven engagement with the pulley 51 to thereby drive the shaft 50 and the feed rolls actuated by the latter. On the shaft 50 is a spur pinion 67 that drives a spur gear 68 keyed to the upper feed roll shaft 18; and the shafts 18 and 17 are operatively connected for simultaneous rotation at equal speeds in opposite directions by coöperating spur gears 69 and 70 on the ends of the shafts 18 and 17 respectively.

The armature shaft 55 of the motor also carries another pulley 71 that is drivingly connected by a belt 72 to a pulley 73 on one end of the cutter shaft 20. It will be obvious that the cutter shaft is driven at a speed of rotation much greater than that of the feed roll shafts, and that the direction of the rotation of the cutter shaft and cutters is the same as that of the lower feed roll shaft.

In the operation of the machine, the operator, seated in front of the machine, introduces a properly dampened leaf, back or stem side up, into the nip of the feed rolls, the base or wide end of the stem being first engaged. As the wide end of the stem is drawn between the flanges 24 of the lower feed rolls and the tapered faces of the upper feed rolls, the coöperating members of both pairs of feed rolls are expanded or forced apart by the crowding of the stem of the leaf between them. The leaf is thus drawn between and through the feed rolls at a speed depending upon the speed of rotation of the latter, and as the butt end of the stem emerges on the other side of the feed rolls it strikes the edge of the stationary guide 40 and by the latter is deflected upwardly through the channel defined by the opposed beveled faces of the upper feed rolls 34 and the overlapping cutting edges of the cutter blades 39. It will be observed that the beveled sides of the rolls 31 and the beveled sides of the cutter blades lie next to and engage the side walls of the stem, so that the stem, even if more or less crooked or sinuous readily follows or tracks with the channel-guide, thereby preventing a tendency almost hitherto universal in machines designed for this work of the cutters to strike across a curved part of the stem and thus get out of tracking relation to the latter. While the leaf is passing through the nip of the feed rolls, the ribs or flanges 24 of the lower roll coöperating with the grooves 34 of the upper roll have the effect of more or less scoring or indenting the leaf on either side of the stem, but they do not cut the leaf away from the sides of the stem, no matter how sharp they may be made, owing doubtless to the damp condition in which the leaves have to be handled, and the fact that the two rolls turn at the same speed. The cutters 39, however, rotating at many times the speed of the feed rolls, not only force the portions of the leaf lying next to and on either side of the stem into the grooves 34, but they effect a clean draw cut, completely severing the stem from the portions of the leaf between which it lies. As the coöperating members of the feed rolls and cutters are all spring-pressed toward each other, they, of course, closely hug the sides of the stem from the wide to the narrow end of the latter, thus avoiding waste of stock and exercising practically nothing but the main stem portion of the leaf. As the lower and upper rolls are connected for simultaneous and equal expanding and contracting movements by reason of the engagement of the ribs or flanges 24 with the annular grooves 34, and as the cutter heads are likewise connected for equal expanding and contracting movements with the upper feed roll members through the engagement of the edges of the cutter blades with the grooves 34 as well as through the yoke bars 41 where the latter are employed, the correct spacing of the cutters is maintained and is not dependent upon the crowding or forcing apart effect of the stem as it passes between the cutters.

It will be evident to those acquainted with this and analogous arts that the machine as herein shown and described may be modified in various particulars without involving any departure from the operative principle or sacrificing any of the advantages thereof. Hence, I do not limit the invention to the particular embodiment herein presented, but reserve the right to make such variations and changes as fairly fall within the spirit and purview of the appended claims.

I claim:

1. In a leaf-stemming machine, the combination with feed mechanism having laterally expansible and contractible members engaging the opposite sides of the stem, of a cutter having laterally expansible and contractible blade members, and means for causing the latter to follow the expanding and contracting movements of said stem-engaging members.

2. In a leaf-stemming machine, the combination with feed mechanism having laterally movable spring-backed members engaging the opposite sides of the stem and forming between them a stem-receiving groove, of a cutter having laterally movable spring-backed blade members, and means for causing the latter to follow the lateral movements of said stem-engaging members.

3. In a leaf-stemming machine, the combination with feed mechanism including a pair of laterally yieldable members engaging the opposite sides of the stem and forming between them a stem guiding groove and themselves grooved adjacent to said stem-guiding groove, of a cutter comprising a pair of laterally yieldable blades the cutting edges of which engage the grooves of said stem-engaging members.

4. In a leaf-stemming machine, the combination of a pair of coöperating feed devices, each comprising a pair of laterally yieldable stem-engaging members forming between them a stem-guiding groove, the stem-engaging members of one of said feed devices being grooved adjacent to the stem-guiding groove, and a cutter comprising a pair of laterally yieldable blades the cutting edges of which engage the grooves of said stem-engaging members.

5. In a leaf-stemming machine, the combination of a pair of coöperating feed devices each comprising a pair of laterally yieldable stem-engaging members forming between them a stem-guiding groove, the stem-engaging members of one of said feed devices being grooved adjacent to the stem-guiding groove and the stem-engaging members of the other feed device having ribs or flanges engaging the grooves of the said stem-engaging members, and a cutter comprising a pair of laterally yieldable blades the cutting edges of which engage the grooves of said stem-engaging members.

6. In a leaf-stemming machine, the combination of coöperating feed rolls, one of said feed rolls comprising a pair of laterally yieldable spring-backed roll members having opposed beveled faces and annular grooves just back of said beveled faces, and the other feed roll comprising a pair of laterally yieldable spring-backed roll members formed with annular ribs or flanges engaging the annular grooves of said first-named roll members, and a cutter comprising a pair of laterally yieldable spring-backed rotary blades the cutting edges of which engage the grooves of said first-named roll members.

7. In a leaf-stemming machine, the combination with a pair of feed rolls adapted to engage the stem of the leaf, of a cutter having a draw-cut engagement with one of said feed rolls at a point beyond the nip of said feed rolls, and means for guiding the stem of the leaf between said feed-roll and cutter.

8. In a leaf-stemming machine, the combination with a pair of feed rolls, each comprising coöperating roll members so mounted as to provide an expansible and contractible stem-engaging groove between them, of a cutter comprising a pair of blade members so mounted as to partake of the lateral movements of said roll members and having a draw-cut engagement with one pair of said feed-roll members, and means for guiding the stem of the leaf between said feed roll and cutter members.

9. In a leaf-stemming machine, the combination with a pair of feed rolls adapted to engage the stem of the leaf, of a rotary cutter comprising a pair of disks the cutting margins of which have a shear engagement with one of said feed rolls at a point beyond the nip of said feed rolls, means for guiding the stem of the leaf between said feed roll and cutter, means for driving said feed rolls, and means for driving said cutter at a speed of rotation greater than that of said feed rolls whereby to draw-cut the leaf as it passes between said feed roll and cutter.

10. In a leaf-stemming machine, the combination with a pair of feed rolls, each comprising coöperating roll members so mounted as to provide an expansible and contractible stem-engaging groove between them, of a cutter comprising a pair of rotary disks so mounted as to partake of the lateral movements of said roll members and having shear engagement with one of said feed rolls, means for guiding the stem of the leaf from the nip of the feed rolls into engagement with the cutter, means for driving said feed rolls, and means for driving said cutter at a speed of rotation greater than that of said feed rolls whereby to draw-cut the leaf as it passes between said feed roll and cutter.

11. In a leaf-stemming machine, the combination with a feed roller having a stem guide and a pair of annular grooves on either side of said stem guide respectively, of a pair of cutter blades the cutting edges of which enter said grooves, and a pair of cleaner fingers engaging said grooves and operating to maintain the latter free from dust, gum and the like.

12. In a leaf-stemming machine, the combination of a laterally movable feed roller having a peripheral groove, a laterally movable cutter member the cutting edge of which engages the groove of said feed roller to sever the stem from the leaf, and a laterally movable cleaner finger having its free end engaging the groove of said feed roller to maintain said groove free from dust, gum and the like.

13. In a leaf-stemming machine, the combination of a pair of feed roller members mounted with capacity for lateral movement toward and from each other and each provided with a peripheral groove, a pair of laterally movable cutter members the cutting edges of which engage the respective grooves of said feed roller members to sever the stem from the leaf, and a pair of laterally movable cleaner fingers having their free ends engaging the grooves of said feed roller members to maintain said grooves free from dust, gum and the like.

14. In a leaf-stemming machine, the combination with a feed roller shaft, of a pair of feed roller members mounted on said shaft with capacity for lateral movement toward and from each other and forming between them a stem-guiding groove, one of said members being formed with a recess or socket in its face and the opposed face of the other member having a mandrel slidably engaging said recess or socket.

JOSEPH F. MOELLER.

Copies of this patent may be obtained for five cents each, by addressing the "Commissioner of Patents, Washington, D. C."